S. RUBEN

Jan. 17, 1933.

Re. 18,713

ELECTRICAL DISCHARGE DEVICE

Original Filed Dec. 6, 1927

Inventor
SAMUEL RUBEN

By his Attorney M. L. Clifford

Reissued Jan. 17, 1933 Re. 18,713

UNITED STATES PATENT OFFICE

SAMUEL RUBEN, OF NEW ROCHELLE, NEW YORK, ASSIGNOR TO RUBEN PATENTS COMPANY, OF NEW YORK, N. Y., A CORPORATION OF DELAWARE

ELECTRICAL DISCHARGE DEVICE

Original No. 1,815,483, dated July 21, 1931, Serial No. 238,218, filed December 6, 1927. Application for reissue filed September 1, 1932. Serial No. 631,412.

This invention relates to an electrical discharge device and more particularly to an evacuated tube functioning through the expansion and contraction of its cathode, responsive to ionic bombardment.

The object of the invention is the provision of an electrical discharge device, by which the relay control is achieved through the utilization of thermal effects produced by variations in the ionic bombardment of the cathode.

The invention is an improvement upon that described in my prior and copending application, bearing Serial Number 180,909, upon a cathode sensitively responsive to ionic bombardment, through variations in the pressure upon the cathode, the movement of which causes the opening and closing of an external circuit contact gap located within a tube. The present device functions wholly by the thermal effect of the ionic bombardment upon the cathode.

Reference is also made to my other and copending patent applications which I have filed in the United States Patent Office, bearing Serial Numbers 534,213; 551,678; 754,957; 23,581; and 155,541, all of which employ the effect of the electronic bombardment of an anode from the cathode to effect the opening and closing of an external circuit contact gap located within a vacuum tube.

Where the thermal effect of ionic bombardment is employed to give the maximum speed in opening and closing a contact gap through the contraction and expansion of the cathode element, it is necessary that the thermally responsive cathode element should be of the smallest practicable mass and operated at the highest practicable temperature to give maximum radiation, and preferably be in a low pressure gaseous atmosphere. A low pressure gas, preferably argon, in the tube allows a rapid dissipation of energy from the filaments and permits ionic bombardment.

A difficulty met in operating this type of relay is the absence of any practicable means for adjusting the contact gap space. This difficulty has been overcome by having the cathode in two parts, one capable of electronic emission, and therefore subject to ionic bombardment and adapted to ready expansion and contraction, responsive to such bombardment and the other, beyond the direct range of and not responsive to the ionic bombardment, and which is used only for adjusting the contact gap space by the heat normally applied to it.

Figure 1:
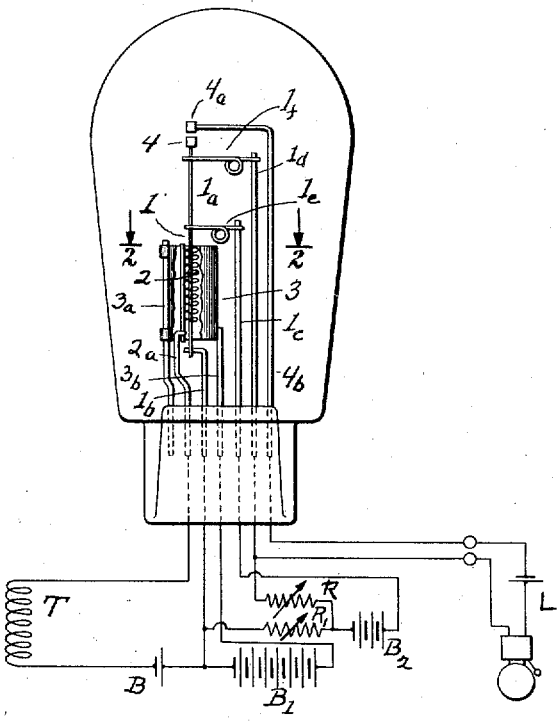
Figure 2:
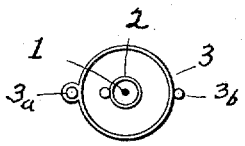

Reference is made to the accompanying drawing illustrating one embodiment of the invention in which Fig. 1 diagrammatically shows a low pressure gas tube containing argon in which are the usual vacuum tube elements, Fig. 2 is a plan view of the three electrodes at section 2—2 of Fig. 1.

Referring to Fig. 1 at 1 is a filament cathode coated with barium-strontium oxides for high electron emission, and against which there is an ionic bombardment from anode 3, both streams being controlled by the potential of grid 2. Cathode 1 is supported under tension by molybdenum spring $1_e$ which also acts as the lead-in-wire for the heating current to the electron emission and the adjustment filaments. Above filament 1 is a length of nickel-chromium wire, the adjustment filament supported under tension by tungsten spring $1_f$ and which is heated for the desired adjustment of the gap between contacts 4 and $4_a$, independently of the temperature of the cathode 1, which is supported by conducting rods $1_b$ and $1_c$. Grid 2 is mounted on conducting rod $2_a$, and anode 3 is supported by insulated rod $3_a$ and conducting rod $3_b$. Conducting rod $1_d$ supports spring $1_f$ and is one of the leads in the external or local circuit to be controlled by the opening and closing of the gap between contacts 4 and $4_a$, the latter mounted on conducting rod $4_b$, which is the other lead in the local circuit. Besides being a lead in the local circuit, conductor rod $1_a$ is a lead in the circuit for heating filament $1_a$ for controlling by temperature regulation, assisted by the tension of spring $1_f$, the length of the filament $1_a$, and therefore the normal position of the movable contact 4 with respect to contact $4_a$, which are preferably of tungsten. It is important that all of the contained parts and walls be deprived of occluded gases and vapors prior to the admission of the argon gas which should be as pure as possible.

The elements of a radio receiving circuit and of a local or bell-ringing circuit are conventionally shown by Fig. 1 in which T represents an input coil, into which electrical oscillations are induced; B is the source of potential for maintaining the grid at a negative potential in respect to filament 1. At $B_1$ is a source of potential for supplying the ionization potential, making possible an ionic discharge between anode 3 and cathode 1. $B_2$ is a source of potential for heating the cathode 1 to emission temperature and for heating the gap adjusting section $1_a$ of the composite filament. R and $R_1$ are variable resistances for adjusting their respective circuit currents; L represents the local circuit in which a bell is connected to be operated by the closing of the contact gap 4—4A.

In operation, as the cathode filament is heated by battery $B_1$ and by the ionic bombardment resulting from the application of the $B_2$ potential. The contact gap is adjusted by the resistor R until the expansion of the non-emission section $1_a$ of the filament brings the contact 4 close to the contact $4_a$. The increased electron stream obtained by the application of a potential to the grid circuit, especially when positive, allows an increase of electronic and ionic flow, with an increase of ionic bombardment on the cathode, causing by its expansion the gap to close and operate the local circuit.

What I claim is:

1. An electrical discharge device comprising an envelope containing a thermionic cathode and an anode and contacts for an external circuit, one of said contacts being controlled by the extensible movement of said cathode.

2. An electrical discharge device comprising an envelope containing anode and thermionic cathode elements, a fixed contact element and a movable contact element, all of said elements having external terminals and said movable contact element being movable with the lineal expansion of the cathode.

3. An electrical discharge device comprising an envelope containing an ionization medium at low pressure, an anode and a thermo-expansible thermionic cathode, a plurality of contact elements, one of which is movable responsive to the lineal movement of the cathode.

4. A thermionic relay comprising an envelope containing argon at low pressure, and anode, grid and thermionic-cathode elements, a fixed contact element and a movable contact element, all of said elements having external terminals, and said movable contact element being connected to said thermionic cathode element for movement therewith responsive to ionic bombardment of said cathode element.

5. A thermionic relay comprising an envelope containing a monatomic gas at low pressure, and anode, grid and thermionic cathode elements, a fixed contact element and a movable contact element, all of said elements having external terminals and said movable contact element being connected to said thermionic cathode element for movement therewith responsive to variations in the ionic bombardment of said cathode element by variations in electrical impulses impressed upon said grid.

6. A thermionic relay comprising an envelope containing a monatomic gas at a low pressure and anode, grid and thermo-expansible thermionic-cathode elements, a fixed contact element and a movable contact element, all of said elements having external terminals, and said movable contact element being connected to said thermionic cathode element for movement therewith responsive to ionic bombardment of said cathode element.

7. A thermionic relay comprising an envelope containing a monatomic gas at low pressure, and anode, grid and thermo-expansible thermionic-cathode elements, a fixed contact element and a movable contact element, all of said elements having external terminals, and said movable contact element being connected to said thermionic cathode element for movement therewith responsive to ionic bombardment of a portion of said cathode element, the normal position of said movable contact element being controlled by the discharge of current through another portion of said cathode element.

8. A thermionic relay comprising an envelope containing a monatomic gas at low pressure, and anode, grid and thermionic-cathode elements, a fixed contact element and a movable contact element, all of said elements having external terminals, and said movable contact element being connected to said thermionic cathode element for movement therewith responsive to ionic bombardment of said cathode element.

In testimony whereof, SAMUEL RUBEN has signed his name to this specification this 31st day of August 1932.

SAMUEL RUBEN.